United States Patent

Paine

[11] 4,056,419
[45] Nov. 1, 1977

[54] METHOD AND BELT OF ORIENTED NYLON WITH RUBBER SHEET ADHERED THERETO

[75] Inventor: Ellis H. Paine, Woodstock, Conn.

[73] Assignee: Moldex, Inc., Wauregan, Conn.

[21] Appl. No.: 636,730

[22] Filed: Dec. 1, 1975

[51] Int. Cl.² .......................... B32B 31/08; C09J 5/02
[52] U.S. Cl. ............................... 156/164; 156/307; 156/308; 156/324; 428/910; 428/474
[58] Field of Search ............... 428/474, 910, 215, 420, 428/346; 156/308, 307, 309, 331, 300–303, 164

[56] References Cited

U.S. PATENT DOCUMENTS

| 2,685,534 | 8/1954 | Kling | 428/474 |
| 2,995,176 | 8/1961 | Waugh | 428/474 |
| 2,999,764 | 9/1961 | Rhoads | 428/474 |
| 3,297,514 | 1/1967 | Poeschl et al. | 428/474 |
| 3,300,370 | 1/1967 | Epstein et al. | 428/474 |
| 3,340,235 | 9/1967 | Holt | 264/175 |
| 3,348,995 | 10/1967 | Baker et al. | 428/215 |
| 3,657,057 | 4/1972 | Shorr et al. | 156/308 |
| 3,791,911 | 2/1974 | Yaeger et al. | 428/910 |
| 3,840,427 | 10/1974 | Brazier et al. | 428/910 |

Primary Examiner—Geroge F. Lesmes
Assistant Examiner—Alexander S. Thomas
Attorney, Agent, or Firm—Harold L. Stults

[57] ABSTRACT

A new product in the form of high tensile strength belting, and the method of making the same. The product is high tensile strength oriented nylon bonded to a layer of rubber on one or both faces. A sheet of nylon film is bonded to one face of a sheet of rubber, and the layer of nylon film on the sheet of rubber is then bonded to a sheet of oriented nylon with an adhesive which bonds the two nylon surfaces together.

1 Claim, 3 Drawing Figures

METHOD AND BELT OF ORIENTED NYLON WITH RUBBER SHEET ADHERED THERETO

This invention relates to high tensile strength belting and the like, and more in particular to producing belting from a sheet of high tensile strength nylon and rubber or other material.

High tensile strength belts have been fabricated from oriented nylon which is produced as disclosed in U.S. Pat. No. 3,340,235. Such belting has been provided with a facing of a layer of leather or other material which presents a desirable surface, such as one which will adhere to pulleys so as to avoid objectionable slippage. It is an object of the present invention to provide improved belts of oriented nylon.

It is a further object to provide a method of producing improved high tensile strength sheets or belts from nylon having a facing or cover sheet adhered to it. It is a still further object to provide a high tensile strength laminate which is adapted for use in the food industry, or in other environments where a nylon surface is not acceptable. It is a still further object to provide for the above in a manner which avoids difficulties which have been encountered in the past. These and other objects will be in part obvious and in part pointed out below.

Figure 1:
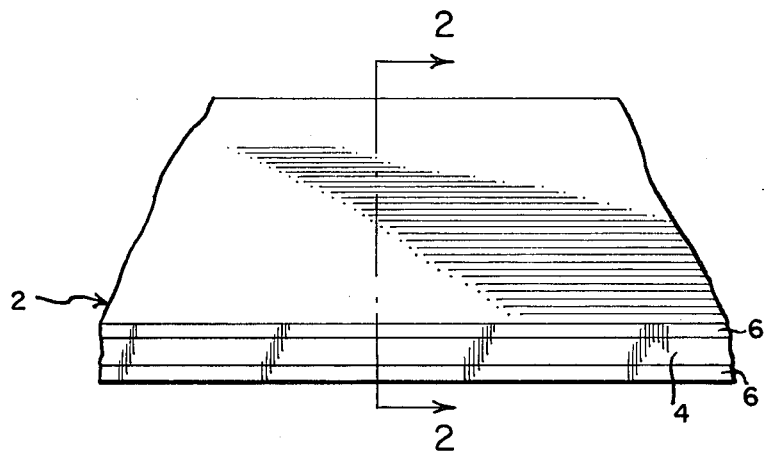
FIG. 1 is a perspective view of a laminated belt constituting one embodiment of the invention.
Figure 2:
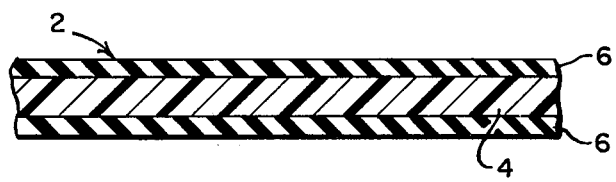
FIG. 2 is an enlarged sectional view on the line 2—2 of FIG. 1.

Referring to FIG. 1 of the drawings, a sheet 2 is a laminate formed by a core 4 of high tensile strength nylon which has been produced in accordance with U.S. Pat. No. 3,340,235. The entire disclosure of that patent is hereby incorporated by reference into this application and into the patent eventuating therefrom. As shown in FIG. 2, sheet 4 has bonded to each of its surfaces a layer 6 of P.V.C. rubber which has been cured and which provides acceptable surfaces to permit a length of sheet 2 to act as a power transmitting belt or a belt carrying a bulk product. Layers 6 are of a known type, and present acceptable surfaces for use in food industries and in other fields.

In the past, it has been known to bond a layer of rubber to a nylon sheet to provide a surface layer having the characteristics of layer 6. Such a laminated belt can be formed with a fabric sheet between the nylon and the layer of rubber, with the fabric sheet first being impregnated with adhesive material which will adhere to both the nylon and the rubber, and then activating the adhesive material to adhere it to the nylon and rubber. However, in practice, the edges or other portions of the fabric were exposed during manufacturing or because of wear, and "wicking" occurred. That is, the exposed fabric tended to absorb liquids from products being handled. That characteristic of the belts is objectionable in many different applications or uses, and made the belts unacceptable for use in processing operations. The fabric may impart rigidity to the laminate, and that may be a serious objection for some conditions of use.

A sheet of rubber can be adhered to nylon only by heat bonding which involves raising the temperature of the nylon. The term "heat bonding" is used herein to mean the known bonding procedures which involve the use of an adhesive under pressure with heating to temperatures of the order of 320° F or more. However, such heating cannot be used to produce a laminate with the high tensile strength nylon sheet as sheet 4, because the heating seriously impairs the orientation and thereby reduces the tensile strength.

Figure 3:
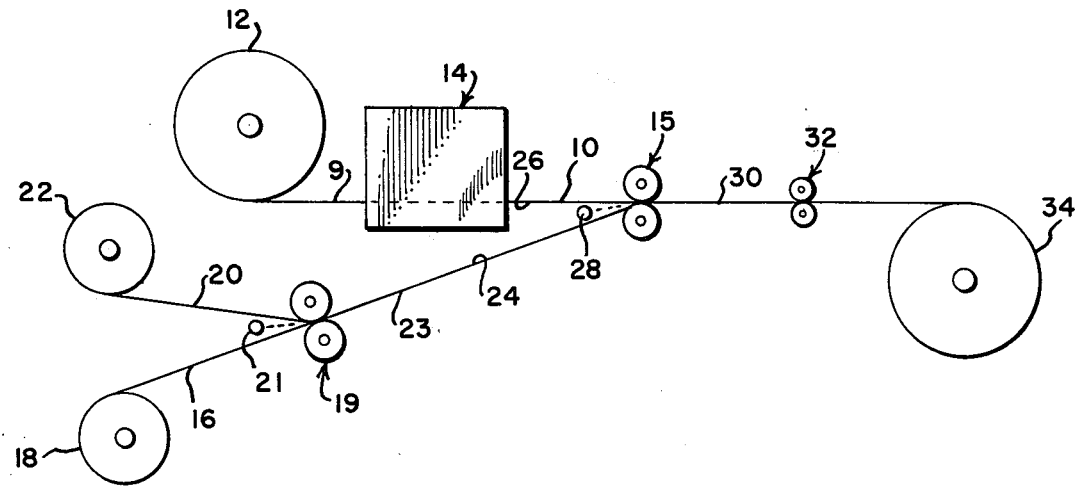
FIG. 3 is a schematic view of the system for producing the belt of FIG. 1.

FIG. 3 is schematic and represents the orientation of a sheet or web 9 of nylon as it is drawn from a roll 12 and is subjected to an orientation process in a system represented at 14. The sheet is oriented in the manner disclosed and claimed in U.S. Pat. No. 3,340,235. A continuous sheet 10, which has been oriented in that manner is drawn into the bite of a pair of compression rollers 15 and is bonded to a layer of rubber. Referring to the lower left hand portion of the figure, the layer of rubber is a continuous sheet 16 which is fed from a roll 18 through a pair of heated pinch rollers 19 in aligned relationship with a continuous sheet 20 of nylon film of 6 mil thickness, which is drawn from a roll 22. An adhesive is deposited between sheets 16 and 20 by a unit 21, and when passing between rolls 19, the sheets are heat bonded by the adhesive and the heat and pressure of the rolls. That produces a continuous laminated sheet 23 formed by sheet 16 having its upper face or surface 24 covered by the continuous film 20. As laminated sheet 23 approaches the bite of rolls 15, its surface 24 moves into contact with the surface 26 of nylon sheet 10, thus bringing the nylon sheet into the mating relationship with the nylon surface formed by film sheet 20. As the two nylon surfaces approach each other, an adhesive liquid is applied to the mating surfaces by a unit 28. The adhesive is of a methanol base "nylon adhesive" of a known type which "activates" the nylon surfaces. As the two sheets move between rollers 15 the nylon surfaces are pressed together and form a secure bond, so as to produce a laminate 30 which comprises the high tensile strength nylon sheet 10 and the laminated sheet 23 which are bonded together throughout their mating surfaces by the layer formed from film 20.

Laminate 30 then passes through a pair or rubber pinch rollers 32 and is wound into a roll 34. Sheet 2 (FIG. 2) is a strip identical with laminate 30, but with a second rubber layer 6 which has been formed and bonded to the upper surface of the nylon sheet in the same manner as the laminated sheet 23 is bonded to sheet 10. These laminates 30 and 2 are unique in that they comprise only a sheet of high tensile strength oriented nylon and one or two layers of rubber with each layer of rubber being bonded to the thin layers of unoriented nylon, and the residue of the nylon adhesive thoroughly bond the rubber to the oriented nylon. Hence, the oriented nylon sustains high tensile strength and the rubber provides the desirable surface characteristics. For example, when a belt formed of sheet 2 is used as a conveyor to elevate a bulk product, the top surface provides the friction to resist product slippage, and the bottom surface provides the proper surface on the drive pulley.

In the illustrative embodiment, the sheet of oriented nylon is 70 mils thick and has a tensile strength of the order of 40,000 pounds per square inch. The rubber is prevulcanized P.V.C. rubber with each layer being 40 mils thick. The bonding of the nylon film to the rubber is at a temperature of the order of 350° F. The laminate is heated to a temperature of the order of 180° F at rolls 15 so as to reduce the time for the bond to be thoroughly effected. However, it is contemplated that a lower temperature can be used, and the ambient temperature would be acceptable under some circumstances. A temperature higher than 180° F may be used, but it is important to insure against heating the oriented nylon above the temperature at which the orientation will be affected materially. It is considered that 220° F is an unsafe temperature in that regard, and the temperature control and other operating conditions should be such as to avoid the possibility of heating the oriented nylon to that temperature.

It is thus seen that a new method has been provided for bonding high tensile strength oriented nylon to materials which cannot be otherwise bonded without seriously impairing the tensile strength of the nylon. Also, a new product has been provided which comprises only nylon and another material such as rubber, and wherein the nylon is oriented so as to have high tensile strength. The bonding layer or surface which is initially heat bonded to the rubber or other material does not contribute materially to the tensile strength of the belt, but it provides the continuous bond between the rubber and the nylon sheet which insures proper operation under severe operating conditions. Also, the laminate has the basic flexibility and other characteristics of the nylon sheet which is restrained only by the rubber sheet or sheets. That gives the desirable "freedom of design" for belts or other products incorporating the invention. The use of a film of nylon insures an even layer of the nylon coating on the rubber so that there is no void in the bond between the rubber and the oriented nylon.

It is understood that various modifications of the illustrative embodiment may be made and that there may be other embodiments of the invention within the scope of the claims.

What is claimed is:

1. The method of producing a high tensile strength laminated belt which is adapted to contact a driving pulley comprising, the steps of, heat-bonding a surface layer of nylon to a sheet of rubber to form a laminate thereof having at least the length and width desired in the completed belt, forming a sheet of high tensile strength oriented nylon of at least the length and width desired in the completed belt, passing said sheets longitudinally along paths toward each other in substantially transverse alignment to a mating position wherein one surface of said sheet of oriented nylon moves into contact with the exposed surface layer of nylon which has been heat-bonded to said sheet of rubber, depositing a liquid which activates nylon onto said exposed surface of said surface layer and said one surface of said sheet of oriented nylon to thereby activate the respective surfaces which are moved together, and exerting pressure and heat progressively against the exposed surfaces of said sheets of nylon and rubber at the zone where they move together at a temperature which is sufficient to insure the bonding of said surface layer to said sheet of oriented nylon and which is below the critical temperature at which the orientation of said sheet of oriented nylon would be impaired substantially.

* * * * *